US012066250B2

(12) United States Patent
Hata et al.

(10) Patent No.: US 12,066,250 B2
(45) Date of Patent: Aug. 20, 2024

(54) METHOD OF INSTALLING HEAT INSULATING BLOCK ON FURNACE SHELL, METHOD OF MANUFACTURING HEAT INSULATING WALL, HEAT INSULATING WALL, INDUSTRIAL FURNACE, AND SET FOR INSTALLING HEAT INSULATING BLOCK

(71) Applicant: MAFTEC CO., LTD., Tokyo (JP)

(72) Inventors: Yusaku Hata, Tokyo (JP); Mitsuo Suzuki, Tokyo (JP); Tomoyuki Kobayashi, Tokyo (JP); Yusuke Kimura, Tokyo (JP); Akihiro Yano, Tokyo (JP); Masakuni Taguchi, Fukuoka (JP)

(73) Assignee: MAFTEC CO., LTD., Tokyo (JP)

( * ) Notice: Subject to any disclaimer, the term of this patent is extended or adjusted under 35 U.S.C. 154(b) by 0 days.

(21) Appl. No.: 17/927,275

(22) PCT Filed: Jan. 20, 2022

(86) PCT No.: PCT/JP2022/002030
§ 371 (c)(1),
(2) Date: Nov. 22, 2022

(87) PCT Pub. No.: WO2022/158532
PCT Pub. Date: Jul. 28, 2022

(65) Prior Publication Data

US 2023/0194172 A1 Jun. 22, 2023

(30) Foreign Application Priority Data

Jan. 22, 2021 (JP) ................................. 2021-009143

(51) Int. Cl.
*F27D 1/00* (2006.01)

(52) U.S. Cl.
CPC .................................. *F27D 1/0013* (2013.01)

(58) Field of Classification Search
CPC ..................................................... F27D 1/0013
See application file for complete search history.

(56) References Cited

U.S. PATENT DOCUMENTS 4,411,621 A * 10/1983 Miller ..................... F27D 1/144
266/283
4,433,480 A 2/1984 Kato
(Continued)

FOREIGN PATENT DOCUMENTS

JP 57-37687 A 3/1982
JP 59-049485 A 3/1984
(Continued)

OTHER PUBLICATIONS

International Search Report for PCT/JP2022/002030 dated Mar. 15, 2022 [PCT/ISA/210].

*Primary Examiner* — Jason L Vaughan
(74) *Attorney, Agent, or Firm* — Sughrue Mion, PLLC

(57) ABSTRACT

Provided is a method of installing a heat insulating block on a furnace shell which enables a heat insulating block to be firmly fixed to a furnace wall but does not require much time and costs for making the heat insulating block, and which further offers good workability at a site. The method of installing a heat insulating block on a furnace shell includes: inserting a beam of a fixture into a fold of an inorganic fiber aggregate mat that is folded up to form a heat insulating block; and fixing the fixture and a furnace shell to each other.

6 Claims, 13 Drawing Sheets

(56) References Cited

U.S. PATENT DOCUMENTS

| | | | | |
|---|---|---|---|---|
| 4,449,345 | A * | 5/1984 | Hounsel | F27D 1/0043 52/509 |
| 4,473,015 | A * | 9/1984 | Hounsel | F27D 1/18 52/474 |
| 4,530,441 | A * | 7/1985 | Miller | F27D 1/0013 220/215 |
| 4,733,620 | A * | 3/1988 | Robbins | F27D 1/0013 52/509 |
| 5,209,038 | A * | 5/1993 | Robbins | F27D 1/0013 52/509 |
| 5,759,663 | A * | 6/1998 | Hounsel | F27D 1/0009 428/126 |
| 6,782,669 | B1 * | 8/2004 | Dixon | F27D 1/0013 52/406.2 |
| 6,920,731 | B2 * | 7/2005 | Skettle | F27D 1/0013 52/506.01 |
| 2013/0019553 | A1 | 1/2013 | Kohno et al. | |

FOREIGN PATENT DOCUMENTS

| | | | |
|---|---|---|---|
| JP | 62-299691 | A | 12/1987 |
| JP | 2011-226771 | A | 11/2011 |
| JP | 2020-125890 | A | 8/2020 |

* cited by examiner

METHOD OF INSTALLING HEAT INSULATING BLOCK ON FURNACE SHELL, METHOD OF MANUFACTURING HEAT INSULATING WALL, HEAT INSULATING WALL, INDUSTRIAL FURNACE, AND SET FOR INSTALLING HEAT INSULATING BLOCK

CROSS REFERENCE TO RELATED APPLICATIONS

This application is a National Stage of International Application No. PCT/JP2022/002030 filed Jan. 20, 2022, claiming priority based on Japanese Patent Application No. 2021-009143 filed Jan. 22, 2021.

TECHNICAL FIELD

The present invention relates to a method of installing a heat insulating block on a furnace shell, a method of manufacturing a heat insulating wall, a heat insulating wall, an industrial furnace, and a set for installing a heat insulating block.

BACKGROUND ART

A heat resisting concrete called a castable is conventionally used for forming a heat insulating wall over an inner face of a steel shell of a heating furnace or the like. In recent years, instead of a castable, a heat insulating material made from an inorganic fiber having fire resistance and heat insulating properties is lined in view of workability for a heat insulating wall and in view of strength of a formed heat insulating wall.

Examples of the method of forming a heat insulating wall with a heat insulating material made from an inorganic fiber include: the paper lining of stacking inorganic fiber mats in parallel to a furnace shell (face of a steel shell), and fixing the mats with studs that are provided perpendicularly to the furnace shell: the stack lining (so-called H anchoring) of stacking inorganic fiber mats perpendicularly to a furnace shell, and fixing the mats with metal fixtures that are fixed perpendicularly to the furnace shell, and rods that are fixed to these metal fixtures and that penetrate through the mats in parallel to the furnace shell; and the modular method of fitting a heat insulating block to a stud that is provided perpendicularly to a furnace shell via a fitting for fixing a heat insulating block (hereinafter may be referred to as "metal fixture for a block"): the heat insulating block is formed by making an inorganic fiber mat a block, and installing the metal fixture for a block on one face of the block (for example, Patent Literature 1).

CITATION LIST

Patent Literature

Patent Literature 1: JP 2011-226771 A

SUMMARY OF INVENTION

Technical Problem

Among them, the stack lining has advantages of fast construction, and low manufacturing costs for blocks. The stack lining leads to, however, a structure of horizontally skewering inorganic fiber mats with rods, in short, a structure of supporting inorganic fiber mats with rods at points. Thus, metal fixtures cannot sufficiently support inorganic fiber mats, which is problematic and which causes a problem of the inorganic fiber mats falling off from a furnace shell (ceiling in particular), or some space generated between the inorganic fiber mats and the furnace shell. At a construction site, the places to be horizontally skewered at inorganic fiber mats depend on a constructor. These places may be slightly different from the right places, and thus, the precision of the construction becomes poor, which is problematic.

The modular method leads to a structure of supporting inorganic fiber mats with beams on faces, which enables the inorganic fiber mats to be firmly fixed to a furnace wall. However, this method requires some time and costs for making a heat insulating block that is provided with a metal fixture, and thus, an improvement in this method in this point is demanded.

From the above, an object of the present invention is to provide a method of installing a heat insulating block on a furnace shell which enables the heat insulating block to be firmly fixed to a furnace wall but does not require much time and costs for making the heat insulating block, and which further offers good workability at a site: a method of manufacturing a heat insulating wall by this method: the heat insulating wall constructed by this method; an industrial furnace provided with this heat insulating wall; and a set for installing the heat insulating block.

Solution to Problem

As a result of their diligent studies to solve the above-described problems, the inventors of the present invention have found the following matters.

a. An inorganic fiber aggregate mat can be firmly fixed to a furnace shell by: inserting a beam of a fixture into a fold of a heat insulating block that is formed by folding up the inorganic fiber aggregate mat, so that the beam supports the inorganic fiber aggregate mat on a face.

b. The time and costs required for manufacturing a heat insulating block can be reduced by the step of making a heat insulating block which leads to a structure of not disposing a fixture in the heat insulating block and which leads to the formation of the heat insulating block and the fixture as separate bodies.

c. On a heat insulating wall made by the above-described method, the support point of a beam of a fixture at which the beam supports a heat insulating block is located outside the heat insulating block. The heat insulating wall made by the above-described method has a structure different from a conventional heat insulating wall in this point.

d. A fixture is provided with beams of different lengths: a longer beam is inserted into and installed in one heat insulating block, and thereafter a shorter beam is inserted into and installed in another heat insulating block; thereby, workability for a heat insulating wall can be improved.

e. Fixtures each provided with a beam to be inserted into one heat insulating block, and inserted into the heat insulating block in two directions, respectively, to be fixed to the furnace shell; thereby, workability for a heat insulating wall can be further improved.

Based on the above matters, the inventors of the present invention have completed the invention as follows.

[1] A method of installing a heat insulating block on a furnace shell, the method comprising: inserting a beam of a fixture into a fold of an inorganic fiber aggregate mat, the inorganic fiber aggregate mat being folded up to form a heat insulating block: and fixing the fixture and a furnace shell to each other, wherein a support point of the beam at which the beam supports the heat insulating block is outside the heat insulating block.

[2] A method of installing a heat insulating block to a furnace shell, the method comprising: preparing a heat insulating block that comprises a folded inorganic fiber aggregate mat, and a fixture that comprises a beam; inserting the beam of the fixture into a fold of the inorganic fiber aggregate mat of the heat insulating block: and fixing the fixture and a furnace shell to each other.

[3] The method according to [1] or [2], wherein the heat insulating block has at least two folds on a face thereof which is to be disposed on the furnace shell.

[4] The method according to [3], wherein the fixture comprises at least two beams, and positions of the beams correspond to positions of the folds of the heat insulating block.

[5] The method according to any one of [1] to [4], wherein the fixture comprises plural beams that are to be installed in two different heat insulating blocks, the beams including a first beam area to be installed in one of the heat insulating blocks, and a second beam area to be installed in another one of the heat insulating blocks, and the first beam area and the second beam area are different from each other in length.

[6] The method according to any one of [1] to [5], wherein every two of the heat insulating blocks which are next to each other are installed, so that a space therebetween is at least 1 mm.

[7] The method according to [6], wherein another inorganic fiber aggregate mat is inserted into the space between every two of the heat insulating blocks which are next to each other.

[8] A method of manufacturing a heat insulating wall, the method comprising: forming a heat insulating wall on a furnace shell by the method defined in any one of [1] to [7].

[9] A heat insulating wall comprising: a heat insulating block comprising an inorganic fiber aggregate mat that is folded up and that has at least two folds on a face thereof which is to be fixed to a furnace shell; and a fixture having at least two beams, wherein the beams of the fixture are inserted into the folds of the heat insulating block, and the fixture is fixed to the furnace shell, and thereby, the heat insulating block is installed on a furnace wall, and support points of the beams at which the beams support the heat insulating block are outside the heat insulating block.

[10] The heat insulating wall according to [9], wherein the fixture comprises plural beams that are installed in two different heat insulating blocks, the beams including a first beam area installed in one of the heat insulating blocks, and a second beam area installed in another one of the heat insulating blocks, and the first beam area and the second beam area are different from each other in length.

[11] The heat insulating wall according to [9] or [10], wherein a space between every two of the heat insulating blocks which are installed on the furnace shell and which are next to each other is at least 1 mm.

[12] An industrial furnace comprising the heat insulating wall defined in any one of [9] to [11].

[13] A set for installing a heat insulating block, the set comprising, as separate members: a heat insulating block comprising an inorganic fiber aggregate mat that is folded up and that has at least two folds on a face thereof which is to be fixed to a furnace wall; and a fixture having at least two beams, wherein positions of the folds of the heat insulating block and positions of the beams of the fixture correspond to each other.

[14] The set according to [13], wherein the heat insulating block is compressed in a direction of laminating the inorganic fiber aggregate mat, and is fixed with a band in a compressed state thereof.

[15] The set according to [13] or [14], wherein the fixture comprises plural beams that are to be installed in two different heat insulating blocks, the beams including a first beam area to be installed in one of the heat insulating blocks, and a second beam area to be installed in another one of the heat insulating blocks, and the first beam area and the second beam area are different from each other in length.

Advantageous Effects of Invention

The method of installing a heat insulating block on a furnace shell according to the present invention enables a heat insulating block to be firmly fixed to a furnace shell, and offers good workability at a site. This method does not require much time and costs for making a heat insulating block.

DESCRIPTION OF EMBODIMENTS

Hereinafter a method of installing a heat insulating block on a furnace shell, a method of manufacturing a heat insulating wall, a heat insulating wall, an industrial furnace, and a set for installing a heat insulating block as examples according to embodiments of the present invention will be described. The scope of the present invention is not limited to the following embodiments.

Unless otherwise specified, the description of "a to b" showing a numeral range means "at least a and at most b" and also encompasses the meanings of "preferably more than a" and "preferably less than b".

Any upper or lower limit concerning the numerical range in this description, even if being slightly beyond the numerical range specified in the present invention, shall be encompassed in equivalents of the present invention as long as offering the same operation and effect as that within the numerical range.

<Method of Installing Heat Insulating Block on Furnace Shell>

A method of installing a heat insulating block on a furnace shell according to the present invention comprises: inserting a beam of a fixture into a fold of an inorganic fiber aggregate mat of a heat insulating block: and fixing the fixture and a furnace shell to each other. Hereinafter each step will be described.

At the stage of making a heat insulating block in the method of installing a heat insulating block on a furnace shell according to the present invention, no fixture is disposed on the heat insulating block, and the heat insulating block and the fixture are made or prepared as separate bodies.

(Step of Inserting Beams 24 of Fixture 20 into Fold of Inorganic Fiber Aggregate Mat 12 of Heat Insulating Block 10)

Heat Insulating Block 10

Figure 1:
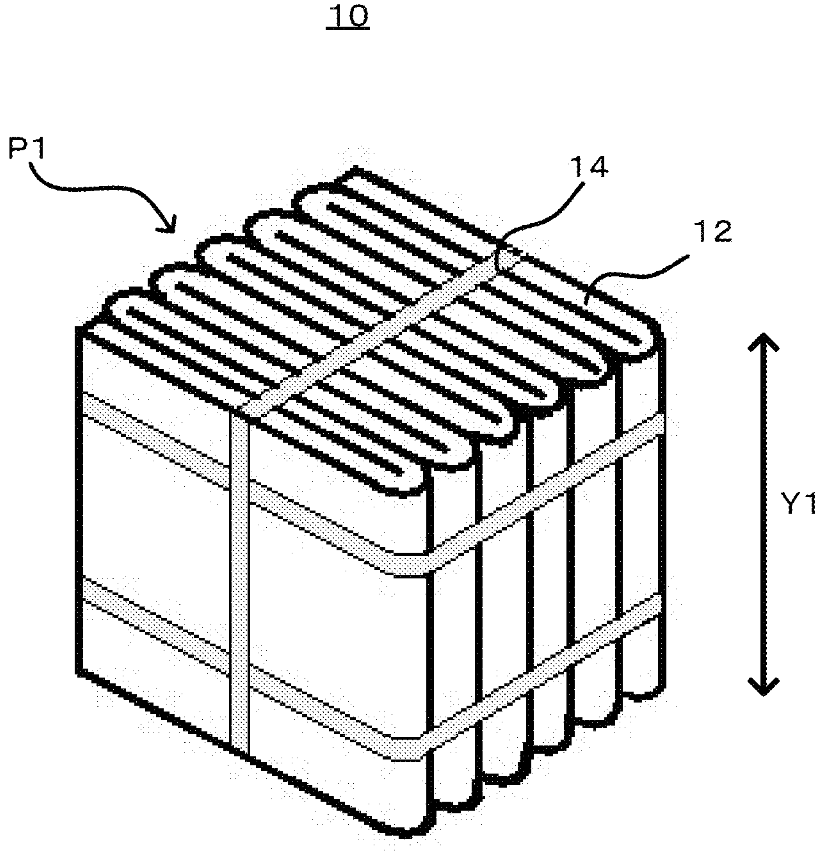
FIG. 1 is a perspective view of a heat insulating block 10 that is used in methods according to the present invention.

The heat insulating block 10 is provided with the inorganic fiber aggregate mat 12 that is folded up. FIG. 1 shows one embodiment of the heat insulating block 10.

Inorganic Fiber Aggregate Mat 12

An inorganic fiber forming the inorganic fiber aggregate mat 12, which forms the heat insulating block 10, is not particularly limited, but examples thereof include silica, alumina/silica, and silica-containing or alumina/silica-containing single or composite fibers of any of zirconia, spinel, titania and calcia. Among them, alumina/silica fibers, particularly polycrystalline alumina/silica fibers are particularly preferable in view of thermal resistance, fiber strength (toughness), and safety. Alumina/silica fibers each having an alumina ratio of 70 to 80 mass % and a silica ratio of 30 to 20 mass % are especially preferable.

As the inorganic fiber aggregate mat 12, a mat (needled blanket) obtained by needling-treating an aggregate of an inorganic fiber that substantially contains no fiber having a fiber diameter of 3 μm or less is preferable because safety is secured and at the same time thermal resistance and durability are improved.

The bulk density of the inorganic fiber aggregate is not particularly limited, but is preferably 85 kg/m$^3$ to 150 kg/m$^3$, and further preferably 90 kg/m$^3$ to 140 kg/m$^3$ in view of the thermal resistance and strength of the heat insulating block 10 to be formed.

The thickness of the inorganic fiber aggregate mat 12 is appropriately selected, but is preferably 10 to 30 mm, and more preferably 12.5 to 27 mm in view of workability and strength. Too small a thickness of the mat 12 causes a lot of trouble with work; and too large a thickness thereof makes it difficult to maintain the structure when the mat 12 is folded up, which are problematic.

The size of the inorganic fiber aggregate mat 12 is not particularly limited. The mat 12 can be treated by appropriately cutting a piece of a preferred size out of the mat 12 according to a site for constructing a furnace shell.

Method of Folding up Inorganic Fiber Aggregate Mat 12

The method of folding up the inorganic fiber aggregate mat 12 of the heat insulating block 10 is not particularly limited as long as a fold appears on a face of the heat insulating block 10 which is to be installed on a furnace shell (face P1 on the left back side of FIG. 1). The face P1 of the heat insulating block 10, which is to be installed on the furnace shell, preferably has at least two, more preferably has at least four folds in view of firmly fixing the heat insulating block 10 to a furnace shell. The upper limit of the number of the folds depends on the size of the heat insulating block 10, but is preferably at most 10, and more preferably at most 8. In the embodiment shown in FIG. 1, five folds are formed on the face P1 of the heat insulating block 10, which is to be installed on a furnace shell.

In the method of folding up the inorganic fiber aggregate mat 12, the one long mat 12 may be folded in a zigzag way as shown in FIG. 1: plural long mats may be folded in a zigzag way and combined: or plural double-fold mats may be prepared and gathered as folds thereof are aligned on the face P1 side.

The bulk density of the heat insulating block 10 is not particularly limited, but is preferably 96 kg/m$^3$ to 160 kg/m$^3$, and preferably 100 kg/m$^3$ to 140 kg/m$^3$. The inorganic fiber aggregate mat 12 used for the heat insulating block 10 may be compressed. The compression ratio is preferably at most 40%, more preferably at most 30%, further preferably at most 20%, further preferably at most 15%, and most preferably 1 to 10% in view of workability in the step of inserting the beams of the fixture described later. This can secure workability for the heat insulating block, and can also improve thermal resistance and durability. A higher compression ratio makes the bulk density of the heat insulating block 10 higher, and improves the thermal resistance of the heat insulating block 10.

The heat insulating block 10 may be sewn with, for example, an alumina rope, to be compressed, or to keep its structure. The bulk density of the heat insulating block 10 may be made to be higher by folding up to laminate the inorganic fiber aggregate mat 12, pressing, with plywood, a metal plate, or the like, both side faces to be compressed and compressing the mat 12, and fixing the mat 12 with, for example, bands 14. As described above, in the present invention, the compression ratio of the heat insulating block 10 is preferably not too high. Thus, plywood or the like disposed on both side faces to be compressed is not essential, but the compression may be kept only with the bands 14 as shown in FIG. 1.

Plural heat insulating blocks 10 may be fixed to a furnace shell by: cutting the bands 14 after the construction to release the compression, so that the heat insulating blocks 10 are in close contact with each other.

In a conventional modular method of constructing a heat insulating wall using a heat insulating block, it is necessary to insert a beam in a space in an inorganic fiber aggregate mat, and to install a metal fixture for a block on a face of the heat insulating block which is to be installed on a furnace shell, which requires some time and costs for manufacturing the heat insulating block. In the method according to the present invention, however, no such a metal fixture is necessary for manufacturing the heat insulating block 10: the heat insulating block 10 can be formed only from the inorganic fiber aggregate mat 12 and the bands 14. Thus, plural heat insulating blocks 10 can be manufactured at low costs for a short time.

That is, in the step of making or preparing the heat insulating block 10, no beam of the fixture is inserted in the heat insulating block 10, and the heat insulating block 10 and the fixture are prepared as separate bodies.

Fixture 20

Figure 2:
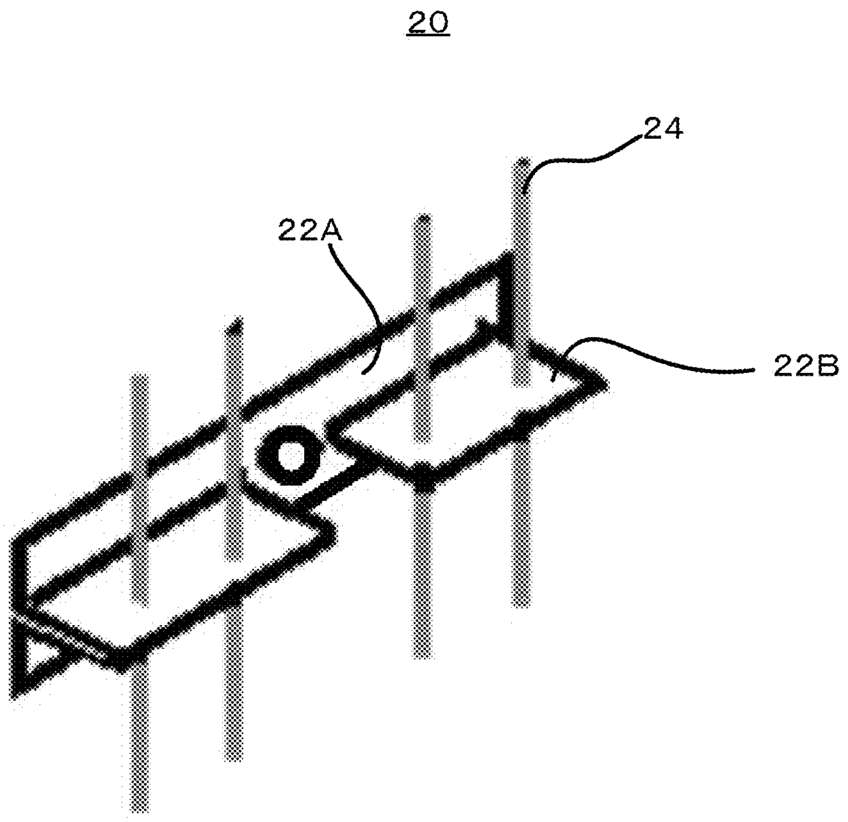
FIG. 2 is a perspective view of a fixture 20 that is used in methods according to the present invention.

In the installation method according to the present invention, the heat insulating block 10 is installed on a furnace shell with the fixture 20, which is a separate member. FIG. 2 shows one example of the fixture 20. The shown fixture 20 is provided with a main body plate 22A including a face to be installed on a furnace shell, a standing piece 22B that stands from the main body plate 22A, and the beams 24 extending from the standing piece 22B in parallel to a furnace shell.

The number of the beams 24 in the fixture 20 is the same as or smaller than the number of the folds of the inorganic fiber aggregate mat 12 of the heat insulating block 10, and is preferably at least 2, and more preferably at least 4. The larger the number of the beams 24 is, the higher the strength at which the heat insulating block 10 is fixed to a furnace shell is but the poorer workability when the beams 24 are inserted into the folds of the inorganic fiber aggregate mat 12 is. Thus, the upper limit of the number of the beams 24 is preferably at most 6. The fixture 20 according to the embodiment shown in FIG. 2 is provided with eight beams 24 in total: four beams upwards in the sheet, and four beams downwards in the sheet.

Figure 3A:
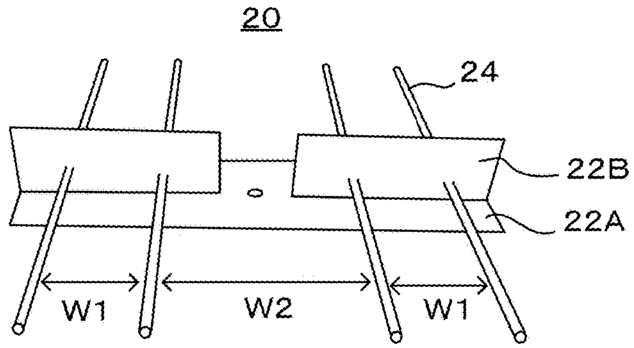
FIG. 3(*a*) is a perspective view of the fixture 20, FIG. 3(*b*) is a front view of the fixture 20, and FIG. 3(*c*) is a plan view of the fixture 20.
Figure 3B:
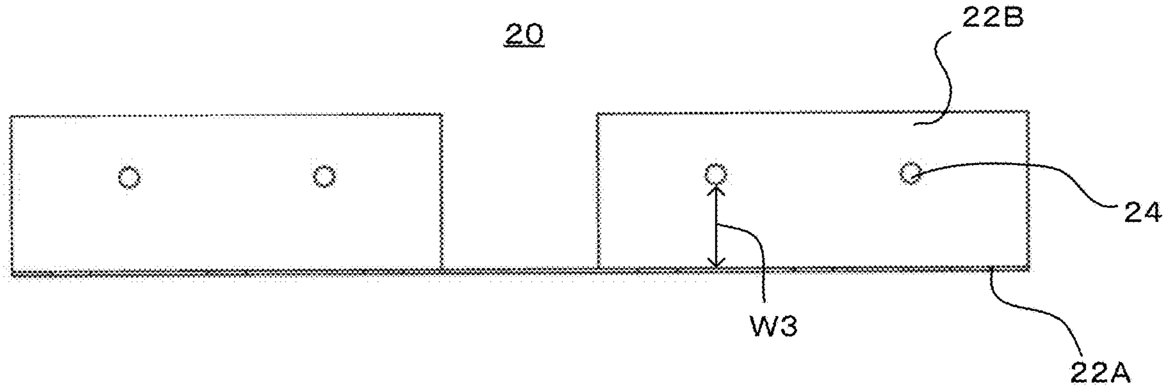
Figure 3C:
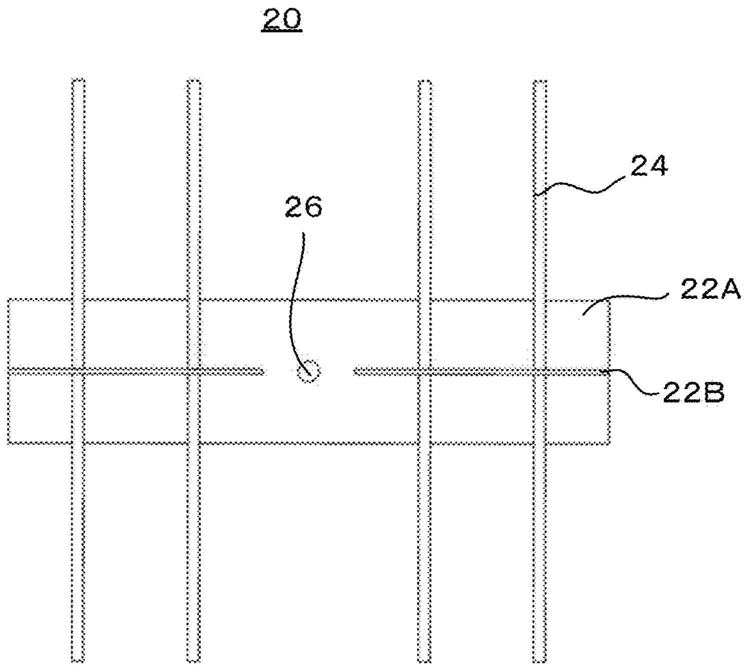

FIG. 3(*a*) is a perspective view of the fixture 20.

The distances between the beams 24, W1 and W2 are dependent on the positional relationship of the folds of the inorganic fiber aggregate mat 12 of the heat insulating block 10, into which the respective beams 24 are to be inserted. For example, when the beam 24 and the beam 24 are inserted into two folds that are next to each other on the installing face P1 of the heat insulating block 10, the distance between these beam 24 and beam 24 corresponds to the thickness of two laminates of the inorganic fiber aggregate mat 12 compressed in the heat insulating block 10.

The breadths W1 and W2 between the beams 24, and the positions of the folds of the heat insulating block 10 may be adjusted by any of the following ways: selecting the thickness of the inorganic fiber aggregate mat 12, or appropriately adjusting the compression ratio of the inorganic fiber aggregate mat 12 when the heat insulating block 10 is manufactured: or making the fixture 20 by adjusting the breadths W1 and W2 between the beams 24 of the fixture 20, so that the breadths are the same as the distances between the folds in the manufactured heat insulating block 10, into which the beams 24 are to be inserted.

FIG. 3(*b*) is a front view of the fixture 20.

In the fixture 20 according to the shown embodiment, the beams 24 are disposed so as to extend from the standing piece 22B in parallel to a furnace shell. The beams 24 are installed on the standing piece 22B apart from a furnace shell by the height W3. The height W3 for the beams 24 corresponds to the thickness of the inorganic fiber aggregate mat 12 at the folded portions in the heat insulating block 10. Thus, the height W3 for the beams 24 of the fixture 20 is adjusted according to the thickness of the used inorganic fiber aggregate mat 12: or the thickness of the inorganic fiber aggregate mat 12 is selected according to the height W3 for the beams 24 of the fixture 20. A slightly lower height W3 than the mat 12 can fill a tiny space between the heat insulating block 10 and a furnace shell.

FIG. 3(*c*) is a plan view of the fixture 20.

The method of installing the fixture 20 on a furnace shell will be described later. The fixture 20 shown in FIG. 3 has, at the center portion of the main body plate 22A, a hole 26 for inserting a stud thereinto. When the fixture 20 is fixed to a furnace shell with a stud by using the hole 26, no beam 24 can be formed above the hole 26. Thus, the beams 24 are arranged on the right and left sides across the hole 26 as the center: the numbers of the beams 24 arranged on the right and left sides, respectively, are the same. In the shown embodiment, every two beams 24 are arranged above and below on each of the right and left sides. When the fixture 20 is not fixed to a furnace shell by inserting a stud into the hole 26 but is fixed thereto by welding, the beam 24 may be disposed at the center of the fixture 20.

Figure 4:
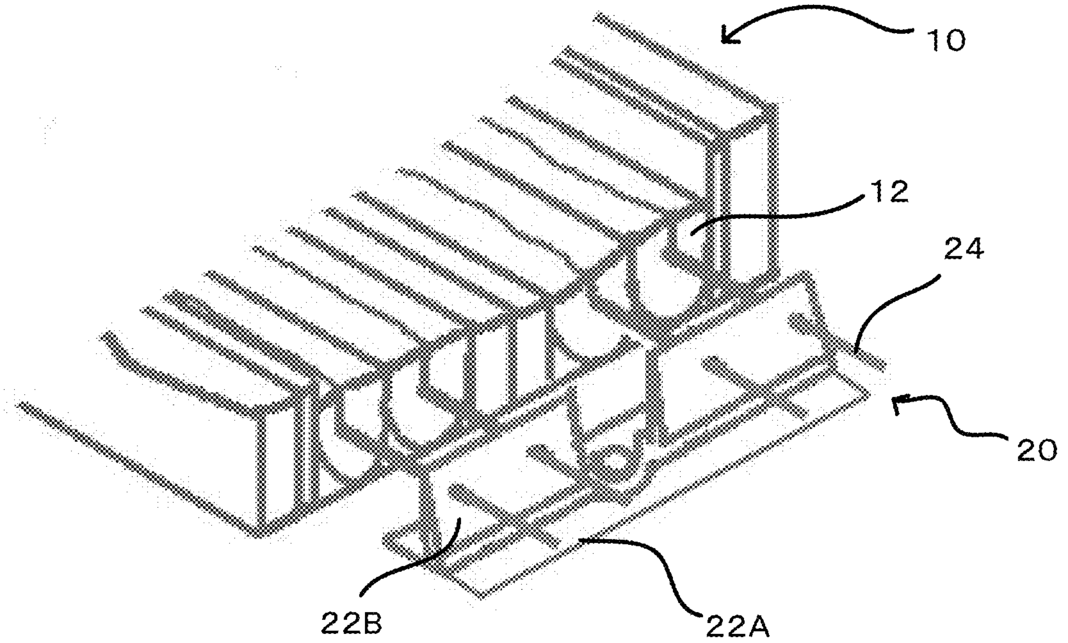
FIG. 4 shows a state of inserting beams 24 of the fixture 20 into folds of the heat insulating block 10.

In the embodiment in FIG. 3(*c*), the beams 24 are disposed so as to extend towards the top and bottom of the fixture 20 in parallel to a furnace shell. In this case, as shown in FIG. 4 (FIG. 4 only shows folded portions of the inorganic fiber aggregate mat 12 of the heat insulating block 10 for clarity), the beams 24 on the upper side of the fixture 20 are inserted into the folds of the inorganic fiber aggregate mat 12 of the heat insulating block 10, which is arranged over the fixture 20; and the beams 24 on the lower side of the fixture 20 are inserted into the folds of the inorganic fiber aggregate mat 12 of the heat insulating block 10, which is not shown and is arranged under the fixture 20. The heat insulating block 10 has a structure of being fixed to a furnace shell by inserting the beams 24 of the fixture 20 from thereabove and therebelow. The lengths of the beams 24 are each preferably any ratio from ¼ to a half, more preferably ⅓ of the length of the heat insulating block 10 in the direction Y1.

The fixture 20 may have a structure of having the beams 24 on any one of the upper and lower sides of the standing piece 22B. In this case, the heat insulating block 10 is fixed with any of the fixtures 20 thereabove and therebelow. The beams 24 preferably have lengths of any ratio from ⅓ to approximately 1 of the length of the heat insulating block 10 in the direction Y1.

Figure 5A:
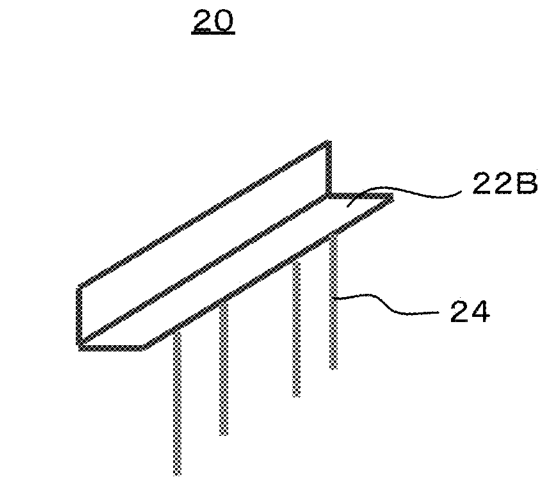
FIGS. 5(*a*) to 5(*c*) are perspective views showing embodiments of the fixture 20, respectively.
Figure 5B:
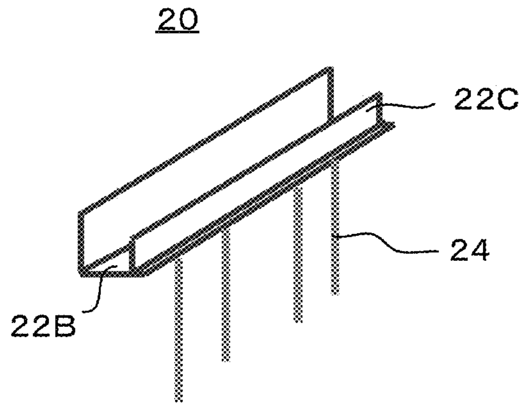
Figure 5C:
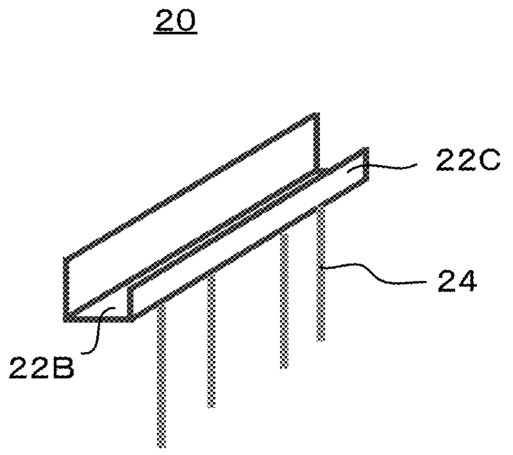

FIG. 5 shows variations of the beams 24.

FIGS. 5(*a*) to 5(*c*) each show an embodiment of the fixture 20 provided with the beams 24 below the standing piece 22B as is seen. In the fixture 20 according to each of the embodiments of FIGS. 5(*b*) and 5(*c*), a piece 22C is provided on the standing piece 22B along a side where the beams 24 are not formed. When the block 10 is fixed to a furnace shell with the fixture 20 from one side, there is a bare possibility that the beams 24 bend due to high temperature creep, so that the block 10 falls off. Supporting, with the piece 22C, other beams 24 of another fixture 20 which supports another heat insulating block that is installed next to the block 10 (hanging the other beams 24, which are next to the beams 24, on the piece 22C) can prevent the other beams 24 from deforming due to high temperature creep.

The piece 22C is not limited as long as having a function of preventing the other beams 24 of the other fixture 20, which is next to the fixture 20, from deforming. The position at the standing piece 22B where the piece 22C is installed is not limited as long as the piece 22C is formed at a position further from a furnace shell than positions at the standing piece 22B where the beams 24 are fixed. As shown in FIG. 5(*c*), the piece 22C may be disposed along an end of the standing piece 22B: or as shown in FIG. 5(*b*), may be formed as an end portion of the standing piece 22B is partially left. The height of the piece 22C is not limited as long as the piece 22C reaches the other beams 24 of the other fixture 20, which is next to the fixture 20. The other heat insulating block 10, which is next to the block 10, is preferably provided with a slit that allows the piece 22C to be inserted thereinto. The piece 22C may be installed on the standing piece 22B by welding: or may be formed by bending the standing piece 22B.

Fixture 20 Having Beams of Different Lengths

Figure 6:
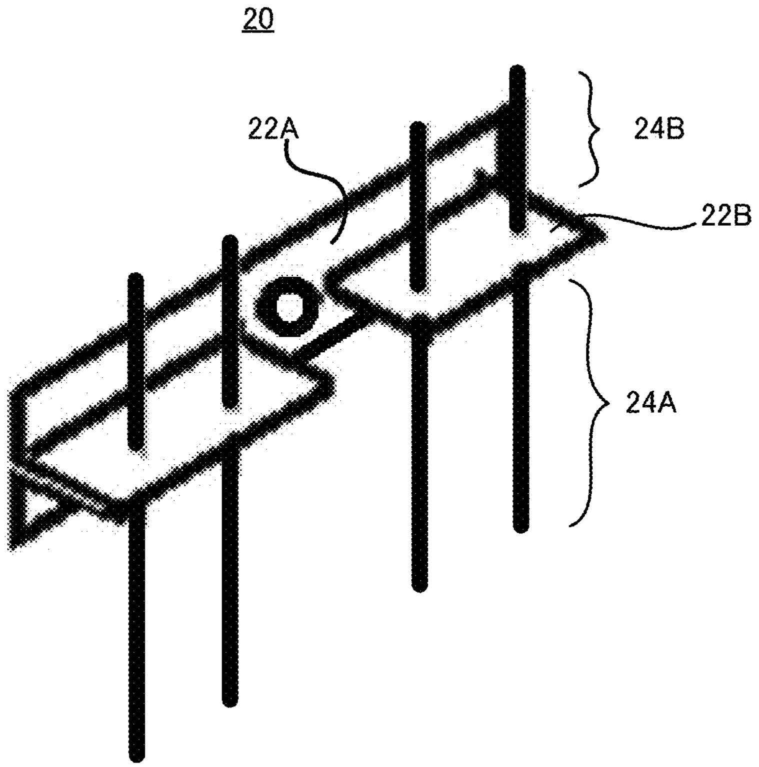
FIG. 6 is a perspective view showing another embodiment of the fixture 20.

As shown in FIG. 6, the fixture 20 may comprise plural beams that are to be installed in two different heat insulating blocks: the beams includes a first beam area 24A to be installed in one of the heat insulating blocks, and a second beam area 24B to be installed in the other heat insulating block: and the first beam area 24A and the second beam area 24B are different from each other in length.

The fixture 20 according to the above-described embodiment makes it possible that: for example, a heat insulating block into which the relatively long first beam area 24A is inserted is installed on a furnace shell via the fixture 20, and thereafter, another heat insulating block is fitted to the relatively short second beam area 24B. The fixture 20 has been fixed to the furnace shell already, and thus, a space is limited, so that it is difficult to install another heat insulating block. However, the second beam area is short, which makes the second beam area easy to be inserted into the folds of another heat insulating block, which improves workability when another heat insulating block is installed. The long first beam area can also improve workability without any deterioration of the durability of the heat insulating blocks.

In this case, the length of the first beam area 24A is preferably any ratio from ⅓ to ⅔ of the length of the heat insulating block 10 in the direction Y1; and the length of the second beam area 24B is preferably any ratio from ⅒ to ⅓ of the length of the heat insulating block 10 in the direction Y1, and specifically, is preferably 30 to 90 mm. The length of the first area and the second area in total is preferably any ratio from ⅓ to ¾ of the length of the heat insulating block 10 in the direction Y1.

When another heat insulating block is fitted, marking the folded portions into which the second beam area 24B is to be inserted improves workability when the second beam area 24B is installed in another block. For the marking, any means such as a pen and a seal may be used: an oil-based pen is most preferable.

Fixture 20 Having L-shaped or T-shaped Beams

Figure 7A:
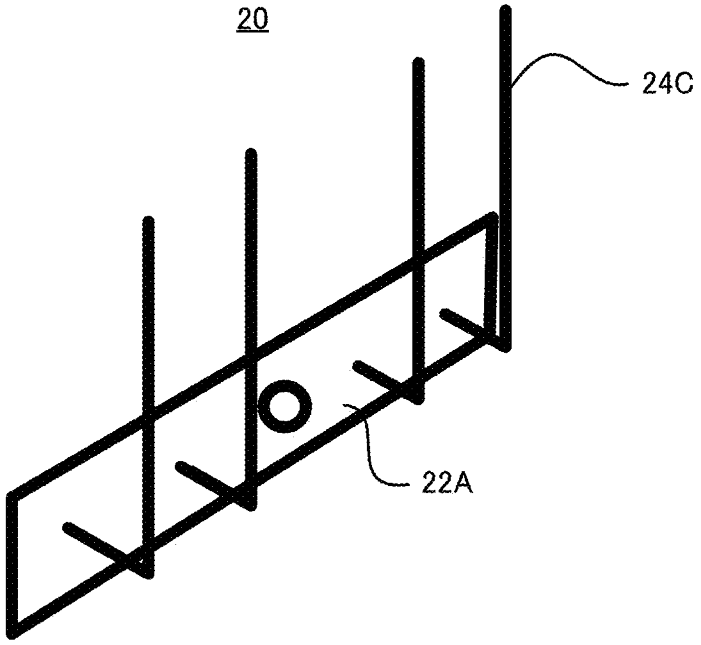
FIGS. 7(*a*) and 7(*b*) are perspective views showing other embodiments of the fixture 20.
Figure 7B:
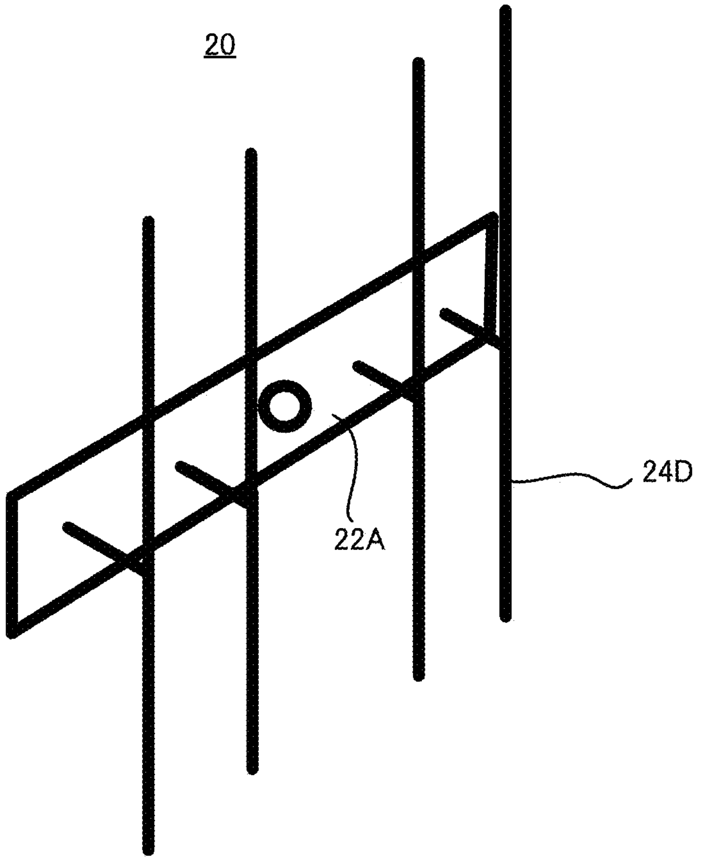

FIG. 7 shows the fixtures 20 according to other embodiments. The fixture 20 may have plural L-shaped beams 24C on the main body plate 22A as shown in FIG. 7(*a*). As shown in FIG. 7(*b*), the fixture 20 may have plural T-shaped beams 24D on the main body plate 22A.

(Step of Fixing Fixture 20 and Furnace Shell to Each Other)

The heat insulating block 10 can be fixed to a furnace shell by fixing the fixture 20 to the furnace shell in addition to the above-described step of inserting the beams 24. In the method of installing the heat insulating block 10 on a furnace shell according to the present invention, the order of carrying out the above-described step of inserting the beams 24, and the step of fixing the fixture 20 to a furnace shell is not particularly limited. One may carry out the step of inserting the beams 24 first, and then, fix the fixture 20 to a furnace shell, or vice versa. In view of workability, it is preferable to carry out the step of inserting the beams 24 first to install the fixture 20 on the heat insulating block 10, and then to fix this fixture 20 to a furnace shell, in that order.

When Fixtures 20 are Fixed to Furnace Shell 30 with Studs 32

The procedures when the fixtures 20 are fixed to the furnace shell 30 with the studs 32 will be described with reference to FIG. 8. First, as in FIG. 8(*a*), a fixture 20A having beams only on the upper side thereof is installed on the bottom of a block 10A. Next, a fixture 20B having beams on both sides thereof is installed on the top of the block 10A.

Figure 8A:
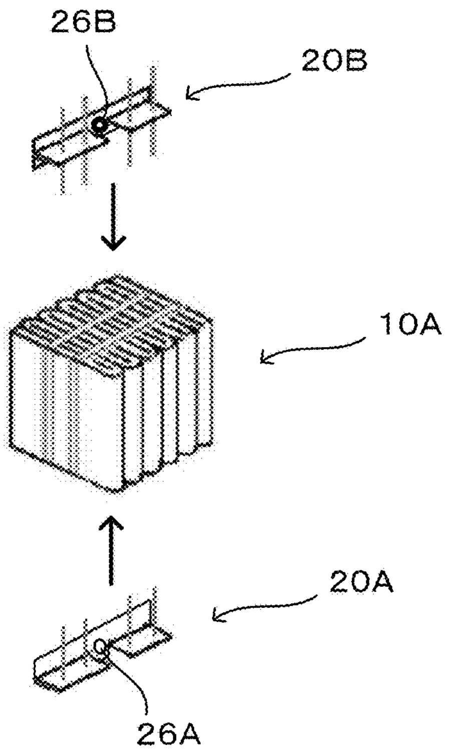
FIGS. 8(*a*) and 8(*b*) are conceptual views showing steps of a method of installing the heat insulating block 10 on a furnace shell according to the present invention, respectively.
Figure 8B:
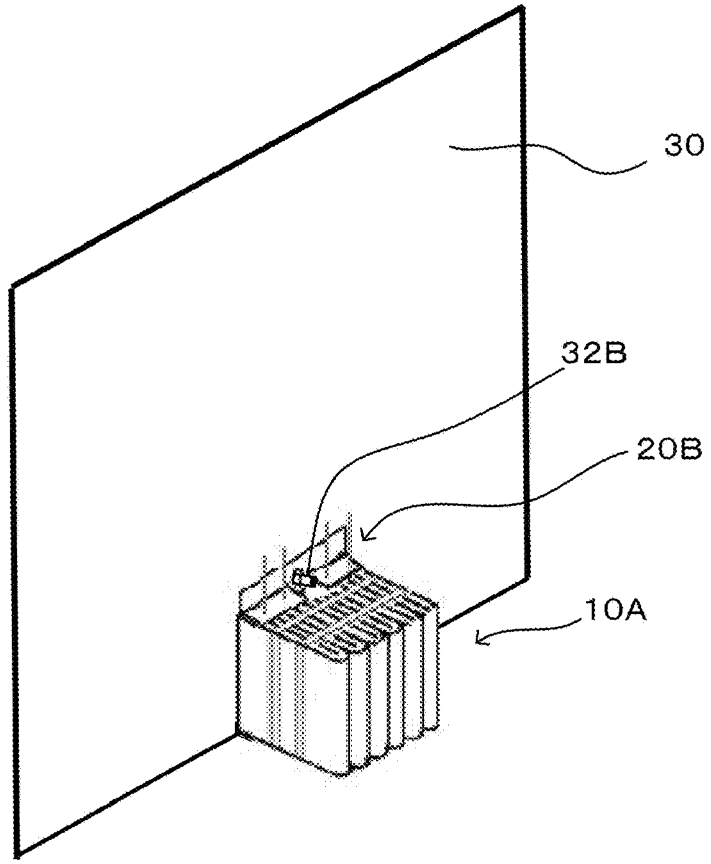

In the embodiment of FIG. 8, the length of each of the beams 24 of the fixtures 20A and 20B is approximately ⅓ of the length of the heat insulating block 10 in the direction Y1.

Next, as shown in FIG. 8(*b*), a stud 32A (not shown) that is made to stand at the furnace shell in advance is inserted into a hole 26A at the center portion of the main body plate 22A, which is installed on the heat insulating block 10A. The heat insulating block 10A is fixed to the furnace shell 30 with the fixture 20A from therebelow by fixing the fixture 20A with a nut from the inside of a furnace. The heat insulating block 10A is fixed to the furnace shell 30 with the fixture 20B from thereabove by inserting a stud 32B, which is made to stand at the furnace shell in advance, into a hole 26B at the center portion of the fixture 20B, and fixing the fixture 20B with a nut from the inside of the furnace.

As the above, the heat insulating block 10A at the first tier is disposed on the furnace shell 30. Plural heat insulating blocks 10A are aligned and disposed in the width direction according to the width of the furnace shell 30 through the same procedures.

Figure 9A:
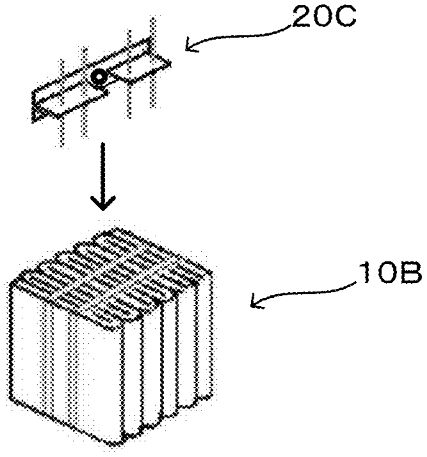
FIGS. 9(*a*) and 9(*b*) are conceptual views showing steps of the method of installing the heat insulating block 10 on a furnace shell according to the present invention, respectively.
Figure 9B:
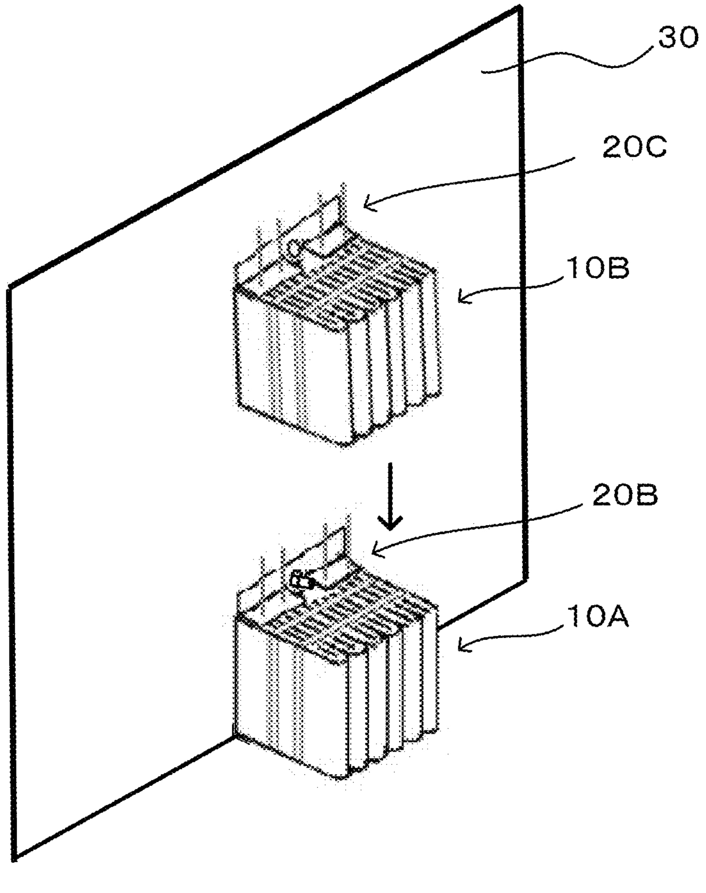

Next, as shown in FIG. 9(*a*), a block that is obtained by installing a fixture 20C (the fixture 20C has the same shape as the fixture 20B, and is provided with the beams 24 upwards and downwards) on the top of a heat insulating block 10B is prepared. As shown in FIG. 9(*b*), the beams 24 of the fixture 20B are inserted into the folds on a face of the heat insulating block 10B on the bottom side where no fixture 20C is installed, so that the heat insulating block 10B at the second tier is disposed. At this time, a stud 32C (not shown) that is made to stand at the furnace shell in advance is inserted into a hole 26C of the fixture 20C, so that fixing to the furnace shell is performed through the same procedures as the above. FIG. 8(*b*) being referred to again, the fixture 20B of the block 10A at the first tier may be fixed to the furnace shell 30 with a nut after the heat insulating block 10B is installed.

As the above, the heat insulating block 10B at the second tier is disposed on the furnace shell 30. Plural heat insulating blocks 10B are aligned and disposed in the width direction according to the width of the furnace shell 30 through the same procedures, which is the same as described above.

Heat insulating blocks 10C . . . at the third and successive tiers are also disposed through the same procedures for disposing the heat insulating block 10B at the second tier described above, so that a heat insulating wall of a desired height is manufactured on the furnace shell. The fixture 20A having the beams 24 only on one side thereof (at a vertically opposite position from the fixture 20A at the first tier) is used for the uppermost heat insulating blocks (or heat insulating blocks at an end portion) forming the heat insulating wall.

Figure 10:
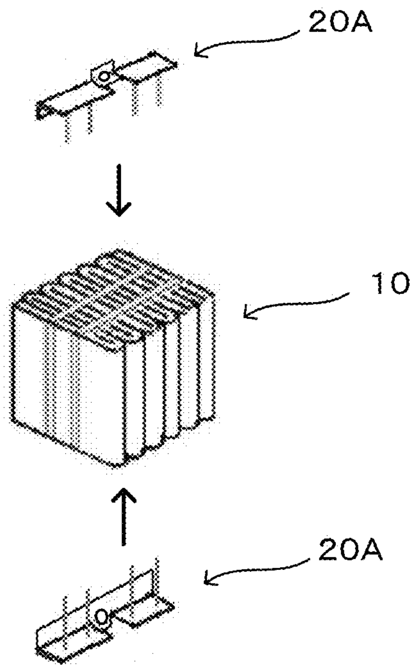
FIG. 10 is a conceptual view showing a state of installing a fixture 20A on the heat insulating block 10.

Instead of the fixtures 20B, 20C . . . , as shown in FIG. 10, the heat insulating blocks may be fixed by installing the respective fixtures 20A, which are each provided with the beams 24 only on one side thereof, on both top and bottom sides of each of the heat insulating blocks 10. In this case, all the heat insulating blocks 10 can be fixed to the furnace shell only with the fixtures 20A, which can reduce the number of the members.

Also in this case, the heat insulating blocks 10 may be fixed by fitting, to one stud, the hole 26 at the center portion of the main body plate 22A of one of the fixtures 20A installed on an upper one of every two heat insulating blocks 10 that are vertically next to each other, and that on a lower one thereof.

Figure 11A:
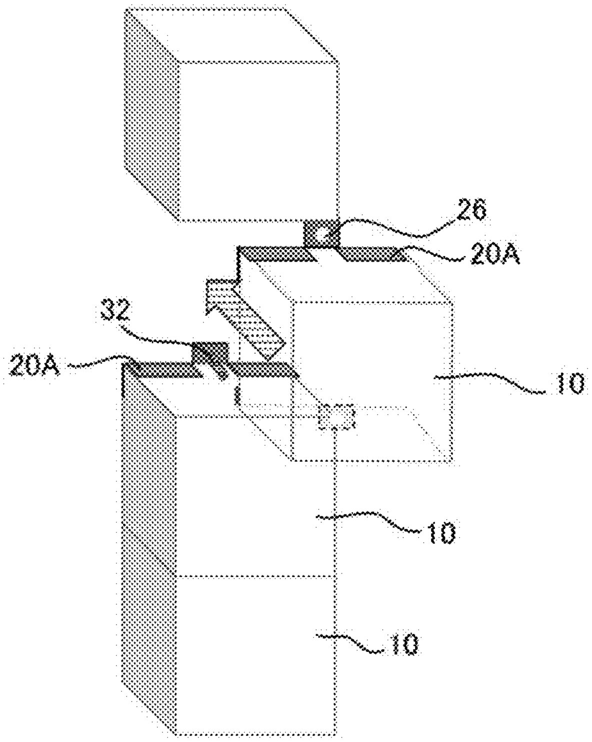
FIGS. 11(*a*) and 11(*b*) are conceptual views showing steps of the method of installing the heat insulating block 10 on a furnace shell according to the present invention, respectively.
Figure 11B:
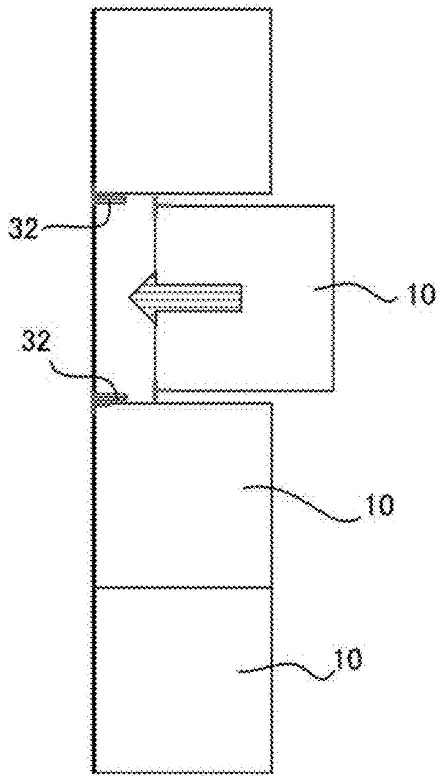

Particularly, when there is no space in the vertical direction (direction of installing the fixtures), for example, when the last one heat insulating block 10 in the uppermost direction is installed, a work space is limited, which makes it difficult to do construction as the beams 24 are inserted to the heat insulating block 10. In this case, as shown in FIG. 11(*a*), which is a perspective view looking from the inside of a furnace wall in construction, and FIG. 11(*c*), which is a cross-sectional view of the furnace wall in construction, the fixtures 20A are installed in advance on the heat insulating block 10, which is installed last, which makes it possible that: the holes 26 at the center portions of the main body plates 22A of the fixtures 20A are fitted to the studs 32 as the heat insulating block 10 is slid towards the studs. In FIG. 11, the heat insulating blocks 10 are piled up from the bottom of the sheet: and at the last stage, in view of workability, the uppermost heat insulating block 10 is disposed first, and then, the heat insulating block at the second tier from the top is disposed.

At this time, a sufficient space between the heat insulating blocks 10 allows the holes 26 to be fitted to the studs 32 as the positions of the holes 26 at the center portions of the main body plates 22A of the fixtures 20A are checked from the inside of a furnace, which improves workability. Further, like the fixtures 20A shown in FIG. 11(*a*), the holes 26 present outside the block 10 makes it easier to observe the positions of the studs 32 and the holes 26 from the inside of a furnace, which improves workability. Therefore, each space between the heat insulating blocks 10 in the vertical direction (direction of installing the fixtures) in FIG. 11(*a*) is preferably 1 mm to 60 mm, further preferably 3 to 40 mm, and further preferably 10 to 30 mm. Filling a space between the heat insulating blocks 10 by inserting the inorganic fiber aggregate mat can improve the heat-blocking capability of the formed heat insulating wall. Too large a space however makes it difficult to insert the inorganic fiber aggregate mat, which deteriorates a heat insulation property.

FIG. 11 shows the case where the holes 26 of the fixtures 20 are provided at slightly different positions from the center portions of the main body plates 22A in the vertical direction (positions of each boundary between the disposed heat insulating blocks 10). When the holes 26 are provided at the center portions of the main body plates 22A in the vertical direction, it becomes difficult to dispose the two fixtures 20 at the studs 32 in structure.

Figure 12:
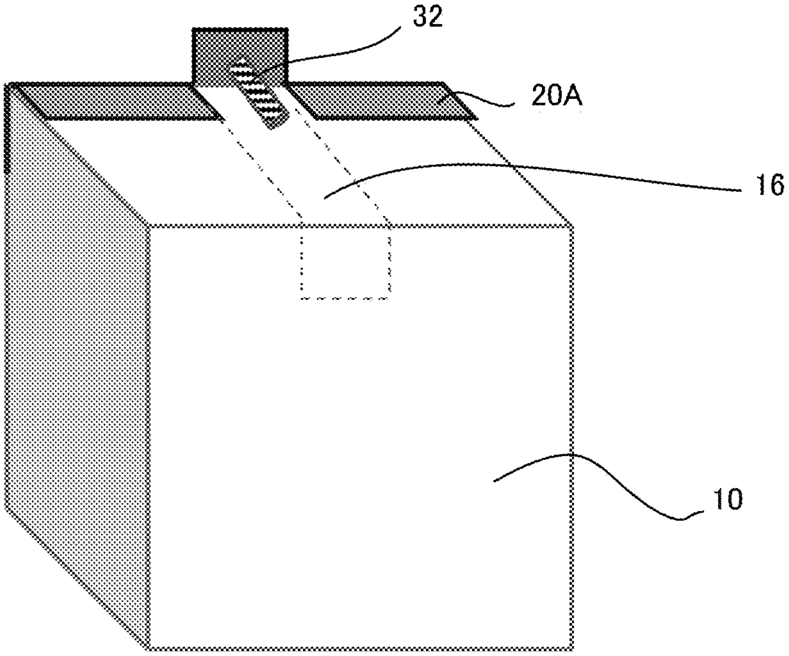
FIG. 12 is a perspective view showing another embodiment of the fixture 20A and the heat insulating block 10.

In this case, as shown in FIG. 12, the heat insulating block 10 is partially shaved to form a groove 16, and thereby, the two fixtures 20 can be disposed at the studs 32 in structure.

When Fixtures 20 are Fixed to Furnace Shell 30 by Welding

The fixtures 20 may be fixed to the furnace shell 30 by welding. In this case, no studs 32, which are made to stand at the furnace shell 30 in advance in the above-described step, are necessary, and the fixtures 20 are directly welded to the furnace shell 30. Any welding method such as arc welding, semi-automatic welding, and TIG welding may be appropriately selected.

Cutting the bands of heat insulating blocks that align in the right-left direction and that are next to each other causes their compression to be released, so that the heat insulating blocks are arranged in close contact with each other.

<Method of Manufacturing Heat Insulating Wall>

The method of manufacturing a heat insulating wall according to the present invention is a method comprising: forming a heat insulating wall on a furnace shell by the above-described method of installing the heat insulating block 10 on a furnace wall.

The position where a heat insulating wall is formed is not particularly limited, but may be on any of a side face, a bottom face, and a ceiling inside a furnace. The method of manufacturing a heat insulating wall according to the present invention exerts a great effect when the heat insulating wall is disposed on a ceiling, on which the heat insulating wall is easy to peel off and fall off from a furnace shell due to the gravity thereof from the viewpoint that the heat insulating blocks can be firmly fixed to the furnace shell.

<Heat Insulating Wall>

A heat insulating wall according to the present invention is formed on a furnace shell by the above-descried method of installing the heat insulating block 10 on a furnace shell or method of manufacturing a heat insulating wall according to the present invention. A preferred embodiment of the heat insulating wall is a heat insulating wall comprising: the heat insulating block 10 comprising the inorganic fiber aggregate mat 12, which is folded up and which has at least two folds on a face thereof which is to be fixed to a furnace shell; and the fixture 20 having at least two beams 24, wherein the beams 24 of the fixture 20 are inserted into the folds of the heat insulating block 10, and the fixture 20 is fixed to the furnace shell, and thereby, the heat insulating block 10 is installed on a furnace wall.

The heat insulating block 10 having at least two folds, and correspondingly to this, the fixture 20 having at least two beams 24 allow the fixture 20 to hold the heat insulating block 10 in a well-balanced manner, and enable the heat insulating block 10 to be firmly fixed to a furnace shell.

(Position of Support Points of Beams 24 at which Beams 24 Support Heat Insulating Block 10)

In the heat insulating wall made according to the above-described method, support points of the beams 24 of the fixture 20 at which the beams 24 support the heat insulating block 10 are positioned outside the heat insulating block. In this point, the heat insulating wall made according to the above-described method has a structure different from a conventional heat insulating wall.

Figure 13A:
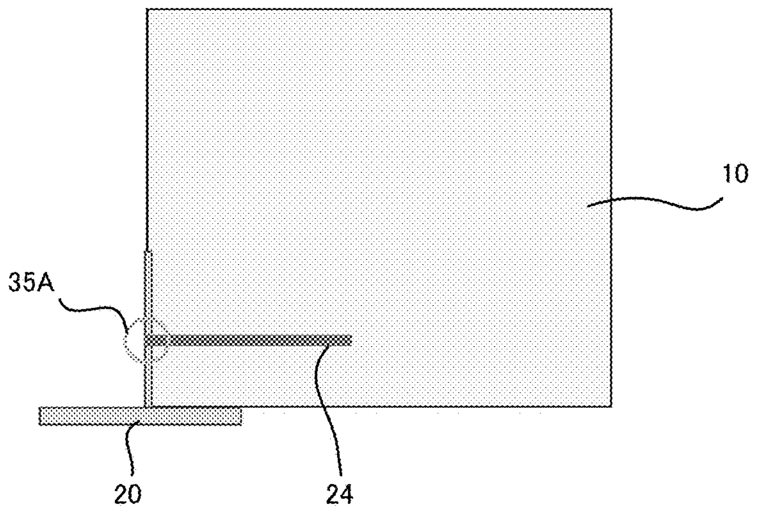
FIGS. 13(*a*) to 13(*c*) are schematic views each illustrating the positions of support points of the beams at which the beams support the heat insulating block.
Figure 13B:
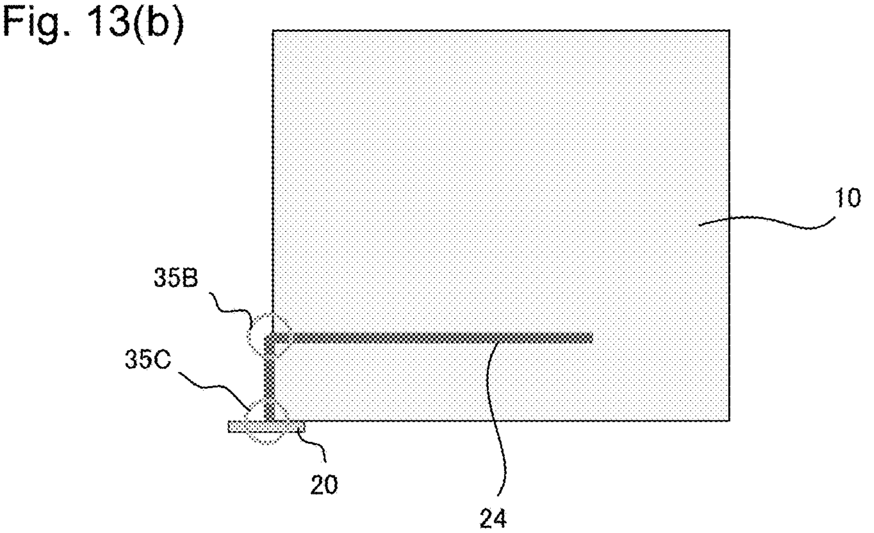
Figure 13C:
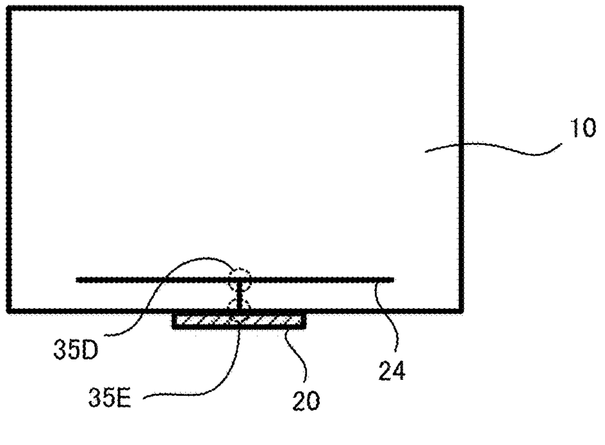

The support points will be described with reference to FIG. 13. FIG. 13(*a*) is a schematic view when the heat insulating block 10 is supported and fixed using the fixture shown in FIG. 5. The lower side of the sheet is the furnace shell side, and the upper side thereof is the inside of a furnace. In this embodiment, the support point of each of the beams 24 at which each of the beams 24 supports the heat insulating block 10 is a support point 35A.

FIG. 13(*b*) is a schematic view when the heat insulating block 10 is supported and fixed using the fixture shown in FIG. 7(*a*). The lower side of the sheet is the furnace shell side, and the upper side thereof is the inside of a furnace. In this embodiment, the support point of each of the beams 24 at which each of the beams 24 supports the heat insulating block 10 is any of a support point 35B and a support points 35C.

As described above, in the heat insulating wall formed by the method according to the present invention, the positions of the support points of the beams 24 at which the beams 24 support the heat insulating block 10 are located outside the heat insulating block 10. Here, "located outside the heat insulating block" means "located outside the heat insulating block when looking from the inside of the furnace (upper side of the sheet)", in short, means that the position of the heat insulating block and the positions of the support points do not overlap each other when looking from the inside of the furnace.

FIG. 13(*c*) shows the positional relationship between a heat insulating block and a fixture which form a conventional heat insulating wall (for example, which are according to an embodiment disclosed in Patent Literature 1). In the heat insulating block disclosed in Patent Literature 1, the beams 24 are buried in an inorganic fiber aggregate mat in advance, so that the fixture 20 is disposed at approximately the center portion of a face of the heat insulating block on the furnace wall side (FIG. 13(*c*) perspectively shows the beams 24 in the heat insulating block). In this case, the support points of the beams 24 at which the beams 24 support the heat insulating block 10 are any of support points 35D and 35E. Both the points are positioned inside the heat insulating block when looking from the inside of a furnace (upper side of the sheet): and the position of the heat insulating block and the positions of the support points overlap each other when looking from the inside of the furnace.

<Industrial Furnace>

An industrial furnace according to the present invention is provided with the above-described heat insulating wall. The industrial furnace is not particularly limited, and for example, can be used as an industrial furnace for various purposes. Particularly, in view of high thermal resistance, the industrial furnace according to the present invention can exert its effect when used as a direct heating furnace of a hot rolling heating furnace or a cold rolling annealing furnace, a forge furnace, or the like.

<Set for Installing Heat Insulating Block>

A set for installing the heat insulating block 10 according to the present invention is a set of the heat insulating block 10 and the fixture 20 which is used in the above-described method of installing the heat insulating block 10 to a furnace shell. A preferred embodiment of this set is a set for installing a heat insulating block which comprises: the heat insulating block 10 comprising the inorganic fiber aggregate mat 12, which is folded up and which has at least two folds on a face thereof which is to be fixed to a furnace wall; and the fixture 20 having at least two beams 24, wherein the positions of the folds of the heat insulating block 10 and the positions of the beams 24 of the fixture 20 correspond to each other.

This set for installing the heat insulating block is a set including the heat insulating blocks 10 and the fixtures 20 in numbers necessary for a heat insulating wall to be formed. A constructor who is to form a heat insulating wall can purchase this set to form the heat insulating wall on a furnace shell in a short time through simple procedures.

INDUSTRIAL APPLICABILITY

The method of installing the heat insulating block 10 on a furnace shell according to the present invention enables the heat insulating block 10 to be firmly fixed to a furnace shell. Thus, this method is useful particularly when a heat insulating wall is formed on a ceiling inside a heat insulating furnace. This method is also useful in the work of repapering heat insulating walls of various new or existing heat insulating furnaces because workability at a site is well and because not much time or costs is required for making the heat insulating block.

REFERENCE SIGNS LIST

10, 10A, 10B heat insulating block
12 inorganic fiber aggregate mat
14 band
16 groove
P1 face disposed on a furnace shell

20, 20A, 20B, 20C fixture
22A main body plate
22B standing piece
22C piece
24 beam
24A first beam area
24B second beam area
24C L-shaped beam
24D T-shaped beam
W1, W2 breadth between beams
W3 height of beam
26, 26A, 26B hole
30 furnace shell
32 stud
35A to 35E support point

The invention claimed is:

1. A heat insulating wall comprising:

a heat insulating block comprising an inorganic fiber aggregate mat that is folded up and that has at least two folds on a face thereof which is to be fixed to a furnace shell; and a fixture having at least two beams, wherein the beams of the fixture are inserted into the folds of the heat insulating block, and the fixture is fixed to the furnace shell, and thereby, the heat insulating block is installed on a furnace wall, and support points of the beams at which the beams support the heat insulating block are outside the heat insulating block, wherein the fixture comprises plural beams that are installed in two different heat insulating blocks, one of which being the heat insulating block, and the beams including a first beam area installed in one of the heat insulating blocks and a second beam area installed in another one of the heat insulating blocks, wherein the first beam area and the second beam area are each extended in a direction away from each other starting from the fixture, and wherein the heat insulating block is installed on the furnace shell by two fixtures, one of which being the fixture.

2. The heat insulating wall according to claim 1, wherein the first beam area and the second beam area are different from each other in length.

3. The heat insulating wall according to claim 1, wherein a space between every two of the heat insulating blocks which are installed on the furnace shell and which are next to each other is at least 1 mm.

4. A set for installing a heat insulating block, the set comprising, as separate members:

a heat insulating block comprising an inorganic fiber aggregate mat that is folded up and that has at least two folds on a face thereof which is to be fixed to a furnace wall; and a fixture having at least two beams, wherein positions of the folds of the heat insulating block and positions of the beams of the fixture correspond to each other, wherein the fixture comprises plural beams that are installed in two different heat insulating blocks, one of which being the heat insulating block, and the beams including a first beam area installed in one of the heat insulating blocks and a second beam area installed in another one of the heat insulating blocks, wherein the first beam area and the second beam area are each extended in a direction away from each other starting from the fixture, and wherein the heat insulating block is installed on a furnace shell by two fixtures, one of which being the fixture.

5. The set according to claim 4, wherein the heat insulating block is compressed in a direction of laminating the inorganic fiber aggregate mat, and is fixed with a band in a compressed state thereof.

6. The set according to claim 4, wherein the first beam area and the second beam area are different from each other in length.

* * * * *